United States Patent
Yessaian

[11] 3,841,488
[45] Oct. 15, 1974

[54] AGITATING STRAINER FOR MACHINE TOOL COOLANT SYSTEMS

[76] Inventor: Harry A. Yessaian, 11769 W. Parkway, Detroit, Mich. 48239

[22] Filed: Aug. 17, 1973

[21] Appl. No.: 389,321

[52] U.S. Cl.................. 210/168, 210/359, 210/388, 210/391
[51] Int. Cl............................................ B01d 33/00
[58] Field of Search .......... 210/167, 168, 384, 388, 210/359, 389, 391, 407

[56] References Cited
UNITED STATES PATENTS

| | | | |
|---|---|---|---|
| 2,134,061 | 10/1938 | Thomas | 210/168 X |
| 2,392,666 | 1/1946 | Harris | 210/388 |
| 2,685,235 | 8/1954 | Lindblad | 210/384 X |
| 2,861,691 | 11/1958 | Linke et al | 210/384 X |
| 3,160,587 | 12/1964 | Waring | 210/168 X |
| 3,455,457 | 7/1969 | Popelar | 210/168 |

Primary Examiner—John Adee
Assistant Examiner—Robert H. Spitzer
Attorney, Agent, or Firm—Robert G. Mentag

[57] ABSTRACT

An oscillating strainer for a cutting tool coolant supply system for a machine tool. The strainer is slidably mounted on the coolant system fixed supply pipe by a slidably mounted support tube. The tube carrying the strainer is oscillated upwardly and downwardly by a support arm which has one end fixed to said tube and the other end pivotally connected to the lower end of a support rod. The upper end of the support rod is eccentrically mounted on the end of a horizontally disposed, rotating shaft so as to provide an upward and downward oscillating movement to the support rod, which oscillating movement is in turn conveyed to the coolant strainer through the support arm and support tube.

5 Claims, 3 Drawing Figures

PATENTED OCT 15 1974 3,841,488

AGITATING STRAINER FOR MACHINE TOOL COOLANT SYSTEMS

SUMMARY OF THE INVENTION

This invention relates generally to the machine tool art and in particular to cutting tool coolant systems for machine tools.

The coolant oil used in a machine tool for cooling the cutting tools is recirculated, and in the course of such recirculation it must pass through a reservoir and a strainer. A disadvantage of the prior art cutting tool coolant systems is that the strainers in such systems are subject to a build-up on the outer surface thereof of dirt particles, metal chips and the like which are carried back to the reservoir after the coolant oil has passed over cutting tools during a cutting operation. Such build-up of dirt and chips on the coolant strainer causes the coolant pump to starve for oil, and such action causes a decrease in cutting tool coolant, and sometimes a complete loss of cutting tool coolant, which in turn causes the cutting tools to burn up, break or be damaged in some way. The aforementioned loss of cutting tool coolant causes machine down time so that the damaged tools can be taken out, reground and reset for further cutting action.

It is an important object of the present invention to provide an oscillating coolant strainer which is adapted to overcome the aforementioned disadvantages of the prior art coolant systems.

It is a further object of the present invention to provide a novel and improved oscillating coolant strainer for a cutting tool coolant system which is simple and compact in construction, economical to manufacture, and efficient in operation.

It is still another object of the present invention to provide an oscillating strainer for a cutting tool coolant system which is adapted to be slidably mounted on the coolant pump fixed supply pipe that extends into the coolant system reservoir, and which includes means for oscillating the strainer upwardly and downwardly on the supply pipe.

It is a further object of the present invention to provide an oscillating strainer for a cutting tool coolant supply system which is operatively disposed in the reservoir of said system. The strainer is movably mounted on the fixed supply pipe of the system which supplies coolant to the pump of the coolant system. A support arm is fixed to the strainer for moving the strainer along said fixed supply pipe to provide an oscillating and agitating motion to the strainer. An operating rod has one end pivotally connected to the support arm and the other end eccentrically mounted to an end of a constantly rotating, horizontal shaft on the machine tool being supplied with the coolant whereby, as said shaft rotates, the operating rod is moved upwardly and downwardly to oscillate said support arm and strainer.

Other objects, features and advantages of this invention will be apparent from the following detailed description, appended claims, and the accompanying drawing.

DESCRIPTION OF THE PREFERRED EMBODIMENT

Figure 1:
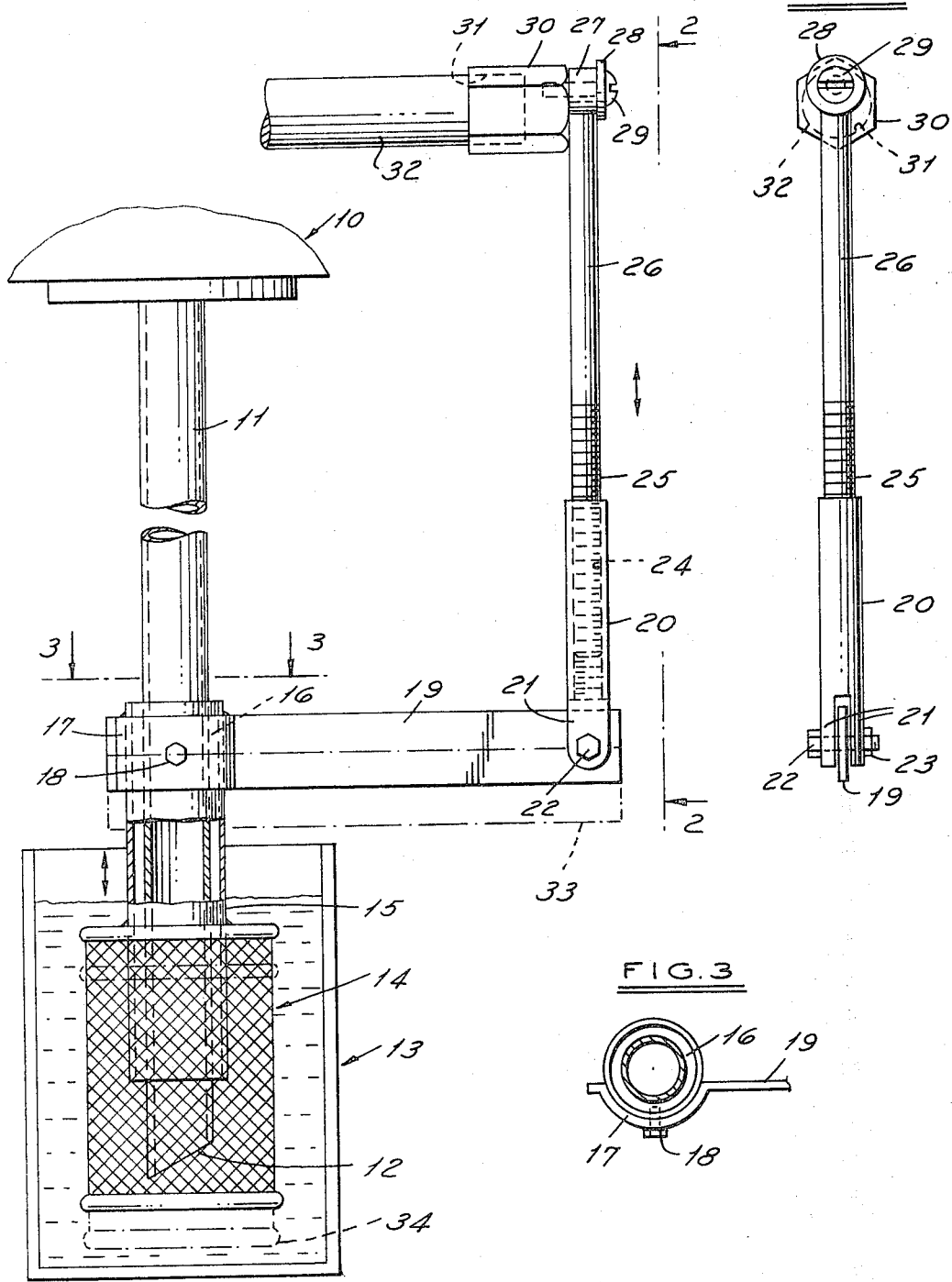
FIG. 1 is a side elevation view of an agitating strainer for a machine tool coolant system made in accordance with the principles of the present invention.

Referring now to the drawing, and in particular to FIG. 1, the numeral 10 generally represents a machine tool which is provided with a coolant system agitating strainer made in accordance with the principles of the present invention. The machine tool 10 may be any conventional machine, as an automatic machine tool, which has one or more cutting tools supplied with a suitable coolant oil from a coolant system reservoir. The numeral 11 indicates the usual coolant oil supply pipe for transferring coolant oil from a coolant oil reservoir 13 to a suitable pump (not shown) for distribution to the cutting tool on the machine tool 10. The pipe 11 extends downwardly into the reservoir 13, and the lower end thereof is indicated by the numeral 12.

In the prior art machine tool coolant systems, the cutting tool coolant oil is drawn through a strainer into a supply pipe as the pipe 11. A disadvantage of the prior art cutting tool coolant oil supply systems is that dirt particles such as metal chips and the like cling to the side of the reservoir screen and eventually build up to a point where the oil is prevented from passing through the supply pipe 11. In accordance with the present invention, the strainer generally indicated by the numeral 14, is oscillated upwardly and downwardly so as to prevent a build-up on the outer surface of the strainer of any chips or other dirt that would prevent passage of cutting tool coolant oil through the strainer.

Figure 2:
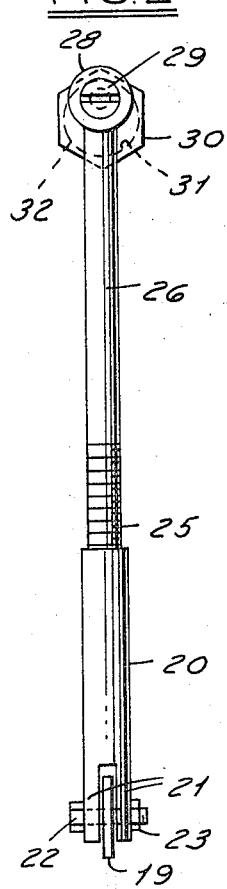
FIG. 2 is a right side elevation view of the structure illustrated in FIG. 2, taken along the line 2—2 thereof, and looking in the direction of the arrows.
Figure 3:
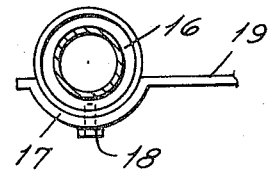
FIG. 3 is a fragmentary, horizontal section view of the structure illustrated in FIG. 1, taken along the line 3—3 thereof, and looking in the direction of the arrows.

As shown in FIG. 1, the strainer 14, which is enclosed at the upper and lower ends thereof, has an opening in the upper end through which is received a support or carrier pipe 15. The pipe 15 is secured to the upper end of the strainer 14 by any suitable means, as by welding. The coolant oil supply pipe 11 extends downwardly through the support pipe 15 and into the strainer 14. As will be seen in FIG. 3, a suitable bushing or bearing means 16 is operatively mounted within the pipe 15 and slidably supports the pipe 15 on the fixed pipe 11. The bushing 16 is held in operative position in the pipe 15 by any suitable means, as by a set screw 18. A half-round attachment strap 17 is fixedly secured to the upper end of the pipe 15 by any suitable means, as by welding. The set screw 18 extends through the attachment strap 17. A horizontal support arm 19 has one end integrally secured to the attachment strap 17. The other end of the support arm 19 is pivotally attached to the lower end of a cylindrical attachment tube 20. As best seen in FIG. 2, the lower end of the tube 20 is bifurcated to provide a pair of laterally spaced apart yoke end members 21. Said other end of the support arm 16 is positioned between the yoke ends 21, and they are pivotally secured thereto by a suitable shoulder bolt 22 and a lock nut 23.

The upper end of the attachment tube 20 is provided with an inwardly extended threaded bore 24 in which is threadably mounted the lower threaded end 25 of a vertically disposed operating rod 26. The upper end of the rod 26 is provided with a cylindrical head 27 that is eccentrically mounted to the outer end of a horizontally disposed nut 30. As shown in FIGS. 1 and 2, the rod head 27 is pivotally mounted on a machine screw 29 that is mounted off center or eccentric relative to the longitudinal axis of the nut 30. A suitable washer 28 is operatively mounted between the head of the machine screw 29 and the rod head 27. The nut 30 is provided with an inwardly extended threaded bore 31 in which is threadably mounted the outer end of a suitable constantly rotating horizontal shaft 32 on the machine tool 10.

In use, the machine tool shaft 32 may be any suitable, constantly rotating shaft on the machine tool 10 and it will be seen that as the shaft 32 is rotated, the rod 26 will move the support arm 19 upwardly and downwardly between the upper solid line position shown in FIG. 1 and the lower dotted line position 33 shown in FIG. 1. The coolant strainer 14 will be moved between the upper solid line position shown in FIG. 1 and the broken line position 34 shown in FIG. 1. The continued upward and downward movement of the coolant strainer in the reservoir 13 provides an agitating action which prevents dirt and metal chips from building up on the outer face of the strainer 14. The dirt and metal chips in the coolant oil in the reservoir 13 are created by the fact that the coolant oil in a machine tool is recirculated or reused. The coolant oil is pumped up to the cutting tools and performs its cooling function and then it is returned by conventional circuits to the reservoir 13 and recirculated or reused.

While it will be appreciated that the preferred embodiment of the invention herein disclosed is well calculated to fulfill the objects above stated, it will be appreciated that the invention is susceptible to modification, variation and change.

What is claimed is:

1. In a machine tool having a rotating shaft and a cutting tool coolant system having a coolant reservoir and a fixed coolant supply pipe extended into the reservoir, the combination comprising:
   a. a coolant strainer operatively disposed in said reservoir;
   b. means movably supporting said coolant strainer on said fixed supply pipe for movement longitudinally of said supply pipe, with said supply pipe extended into said strainer; and,
   c. means for oscillating said means for movably supporting the strainer on said supply pipe to provide an oscillating motion longitudinally of said supply pipe to said strainer to prevent a build-up of dirt and the like on the outer surface of said strainer.

2. In a machine tool coolant system, the combination defined in claim 1, wherein:
   a. said means movably supporting said coolant strainer includes a support member attached to said strainer.

3. In a machine tool coolant system, the combination defined in claim 2, wherein said oscillating means includes:
   a. a support arm attached to said support means; and,
   b. a support rod having one end operatively connected to said support arm and the other end operatively connected to a power drive means on said machine tool.

4. In a machine tool coolant system, the combination defined in claim 3, wherein:
   a. said support member includes a support tube fixed to said strainer and having said supply pipe extended through said support tube.

5. In a machine tool coolant system, the combination defined in claim 2, wherein:
   a. said support rod has the other end eccentrically mounted on an end of said machine tool rotating shaft.

* * * * *